United States Patent [19]
Liot et al.

[11] 3,930,054
[45] Dec. 30, 1975

[54] METHOD OF MAKING IMPROVED DRIED EGG PRODUCT

[76] Inventors: Roger Liot; Evelyne Liot, both of 134 Avenue Laferriere, Creteil, France

[22] Filed: Apr. 12, 1974

[21] Appl. No.: 460,557

Related U.S. Application Data

[63] Continuation of Ser. No. 306,415, Nov. 14, 1972, abandoned, which is a continuation of Ser. No. 68,489, Aug. 31, 1970, abandoned.

[30] Foreign Application Priority Data

Oct. 21, 1969 France .............................. 69.36084

[52] U.S. Cl. ................ 426/614; 426/471; 426/613
[51] Int. Cl.² ............................................ A23B 4/04
[58] Field of Search ........... 426/211, 151, 227, 348, 426/321, 471

[56] References Cited
UNITED STATES PATENTS

| | | | |
|---|---|---|---|
| 2,093,786 | 9/1937 | Swarthout | 99/113 |
| 2,142,511 | 1/1939 | Harris | 99/196 |
| 3,082,098 | 3/1963 | Bergquist | 99/210 |

OTHER PUBLICATIONS

Les Celynols (Melle-Bezons) Societe des Usines Chemiques Rhone–Poulenc.
Organic Chemistry–Morrison 2nd Ed. 1966, Allyn & Baun Inc., Berlin, pp. 673, 683.

*Primary Examiner*—Norman Yudkoff
*Assistant Examiner*—Hiram H. Bernstein
*Attorney, Agent, or Firm*—Brisebois & Kruger

[57] ABSTRACT

A sucroglyceride or an ester of a fatty acid of saccharose is added to liquid whole eggs, egg yolk or egg whites, and the resulting product is dried.

13 Claims, No Drawings

METHOD OF MAKING IMPROVED DRIED EGG PRODUCT

This is a continuation of application Ser. No. 306,415, filed Nov. 14, 1972, now abandoned which was itself a streamlined continuation of Ser. No. 68,489, filed Aug. 31, 1970 now abandoned.

SUMMARY OF THE INVENTION

This invention relates to improved dried egg products. Powdered whole eggs, powdered egg whites, or powdered egg yolks, or mixtures of the two latter compositions, are frequently used in certain food industries, in particular in cake baking, and in the preparation of desserts, sauces or dietic products.

These powders are commercially prepared by several different dehydrating processes, the most commonly used of which is atomization. This process consists in dispersing the liquid under pressure in a current of very hot air. The powders may also be obtained by drying on drums, or on plates, by lyophilization, or by foam drying.

At the moment of use the dried egg product is reconstituted by adding water to the powder, or by mixing it with any other suitable liquid, such as milk.

The reconstituted egg products do not, however, have the same properties as fresh or frozen eggs. In addition to the fact that their rehydration is difficult and is generally accompanied by the formation of objectionable lumps, their emulsifying and foaming properties are substantially inferior to those of fresh eggs. Moreover, they have a disagreeable taste which prevents their use in certain products.

In order to overcome these disadvantages, it has been suggested that various ingredients be incorporated into the egg product before it is dried, such as glyceryl esters or the esters of higher fatty acids and polyhydroxylated compounds. However, these additives are difficult to incorporate into the starting egg product (whether it be whole egg, egg yolk, or egg white), and the rehydrated dry product continues to have a disagreeable taste.

It has also been suggested that carbohydrates be incorporated into the starting egg product. However, if these carbohydrates have the advantage of improving the taste of the resulting powder, the powders are then difficult to rehydrate and their foaming qualities and emulsifying properties are not entirely satisfactory.

Finally, in the particular case of egg whites, it has also been proposed to incorporate additives such as triethylcitrate or biliary salts into the starting product. This addition produces a powder which is easier to rehydrate and which foams more rapidly. However, the foam produced by means of these egg white powders has the disadvantage of not being very firm.

The present invention is intended to eliminate these disadvantages.

The invention consists in incorporating into the egg to be dehydrated (either the complete egg product or one from which natural reducing sugars have been completely or partially removed) a certain proportion of saccharose or sucroglyceride esters, that is to say the products resulting from the transesterification of natural triglycerides of animal or vegetable origin with saccharose.

The sucroglycerides used in the invention are, in particular, those of lard, tallow, palm oil, corn oil, copra, and soy, whereas the saccharose esters used may be, for example, saccharose mono- or di-stearate, saccharose mono- or di-oleate, saccharose mono- or di-palmitate, or saccharose mono- or dilaurate.

These additives have the double advantage of being easily incorporated into the starting product (whether it be whole egg, egg yolk or egg white), with which they rapidly form a homogeneous and stable mixture and, on the other hand, of producing a dry product which rehydrates easily without forming lumps.

Moreover, in the case of egg whites, the product resulting from rehydration of this dried product produces a foam having exceptionally firm properties. When the taste of the final product is of importance, it is recommended to add to the foregoing additives a carbohydrate such as glucose or saccharose, or a mineral salt such as sodium chloride, or a mixture of these compounds. This addition should be made in the proportion of about 1 to 20 percent by weight of the starting egg product.

The proportion of saccharose sucroglyceride esters to be incorporated into the starting product is itself a function of the nature of the product to be dehydrated.

Thus, in the case of whole egg or egg yolk, from 0.05 to 10 percent by weight of sucroglycerides or saccharose esters should be used. In the case of egg white, on the contrary, it is sufficient to incorporate from 0.005 to 2 percent by weight of the sucroglycerides or the saccharose esters.

This incorporation is made while stirring the mixture vigorously by any suitable mechanical means, and preferably after first dispersing the selected additive in a small quantity of water (about ½ to ⅛ by weight of the additive), or in a small part of the egg pproduct to be treated, which dispersion is preferably carried out by heating at a temperature of 50° to 80°C.

The dry egg product is then prepared in a conventional manner by drying the resulting mixture, possibly after pasteurization, concentration, or cooking of the mixture or the starting egg product.

It goes without saying that conventional ingredients commonly used in the food industry, such as carraghenates, alginates, natural gums, starches, sugars, acids, fatty substances, emulsifiers and perfumes may be added to the mixture.

The following examples are given purely by way of illustration and it should be appreciated that the scope of the invention is not limited thereto:

EXAMPLE 1

2 kg of palm oil sucroglyceride sold commercially by the MELLE-BEZONS Company under the trademark "MSPO 11", which has first been incorporated into 5 kg of whole eggs, at a temperature of 65°C, is added to 59 kg of whole eggs.

The mixture is homogenized by stirring it very energetically for five minutes after which it is dried by atomization.

The resulting powder dispersed much more easily and rapidly in water than pure dried egg products.

EXAMPLE 2

1.500 kg of palm oil sucroglyceride is dispersed in 0.700 kg of water to which 0.700 kg of sugar has been added at a temperature of 80°C.

This emulsion is incorporated into 100 kg of pasteurized whole egg to which 11.300 kg of sugar has been added, and the mixture is homogenized by stirring it vigorously for 5 minutes. The powder obtained by atomization of this mixture at a temperature of 200°C is readily dispersible in water or milk, and the reconstituted egg made from this powder has the emulsifying and foaming properties of fresh egg. Moreover, its taste is comparable to that of the fresh sugared egg.

EXAMPLE 3

Proceeding in the manner described in Example 1, 100 kg of whole egg, 2 kg of copra sucroglyceride and 4 kg of sodium chloride are mixed together. This mixture is pasteurized before drying it by atomization. The resulting product is readily dispersible in water and its taste is comparable to that of fresh salted egg. Moreover, it has excellent emulsifying properties.

EXAMPLE 4

A mixture of 100 kg of egg yolks and 12 kg of cane sugar is homogenized in a piston type apparatus under a pressure of 150 kg/cm$^2$, and subsequently pasteurized at 64.5°C.

An emulsion of 2 kg of lard sucroglyceride in 1 kg of water and 1 kg of cane sugar prepared at 80°C is incorporated into this mixture while stirring. The resulting mixture is dried by atomization. The egg yolk reconstituted by addition of water to the powder thus prepared has all the taste, emulsifying, and foam forming properties of fresh sugared egg yolk.

EXAMPLE 5

An emulsion of 0.05 kg of palm oil sucroglyceride in 0.5 kg of water and 1 kg of saccharose which has been prepared at 80°C, is incorporated into 100 kg of egg white which has first had the sugar eliminated therefrom by enzymatic treatment.

The powder obtained by atomization of this mixture is easily incorporated into water and the reconstituted egg white made from this powder produces a foam having a stability clearly superior to the foam obtained from the powder of pure egg white.

The dried egg products produced in accordance with the invention have excellent properties with respect to foam forming and emulsification, as well as a taste substantially superior to that of pure dry egg products, and therefore constitute excellent intermediate products for use in the food industry, particularly in baking.

What is claimed is:

1. A method of preparing a dried egg product that rehydrates easily without forming lumps which comprises the steps of combining a liquid egg with the reaction products resulting from the transesterification of natural triglycerides of animal or vegetable origin with saccharose and drying said egg composition to form a powder.

2. The method of claim 1 in which said transesterification reaction product is selected from the group resulting from the transesterification of palm oil, lard, tallow, copra, corn and soy sucroglycerides.

3. The method of claim 2 in which said transesterification reaction product consists of mono and diglyceride, and mono and diesters of saccharose.

4. The method of claim 1 in which the liquid egg product is egg yolk and said transesterification reaction product is incorporated thereinto at the rate of 0.05 to 10 percent by weight of the starting egg yolk.

5. The method of claim 1 in which the liquid egg product is egg white, and said added transesterification reaction product is incorporated thereinto in the proportion of 0.005 to 2 percent by weight of the starting egg white.

6. The method of claim 1 in which a carbohydrate is also added to the liquid egg product.

7. The method of claim 1 in which the natural reducing sugars are at least partially removed from the starting egg product.

8. The method of claim 1 in which sodium chloride is also added to the liquid egg product before it is dried.

9. The method of claim 1 in which said product is atomized to form a dry powder.

10. A powdered egg composition which rehydrates easily without forming lumps comprising an atomized, dried mixture of (a) egg and (b) the reaction products resulting from the transesterification of natural triglycerides of animal or vegetable origin with saccharose.

11. The product of claim 10, in which said powdered egg is powdered whole egg or egg yolk and the mixture contains 0.05 to 10 percent by weight of (b) calculated on the basis of the undehydrated liquid egg.

12. The product of claim 10, in which said powdered egg is powdered egg white and the mixture contains 0.005 to 2% by weight of (b) calculated on the basis of the undehydrated liquid egg.

13. The method of Claim 10 in which 0.005 to 10% by weight of said transesterification reaction product is incorporated into said liquid egg.

* * * * *